Oct. 28, 1958 H. HOFFMAN ET AL 2,857,891
INTERNAL COMBUSTION ENGINE OF THE DIESEL TYPE
Filed March 24, 1954
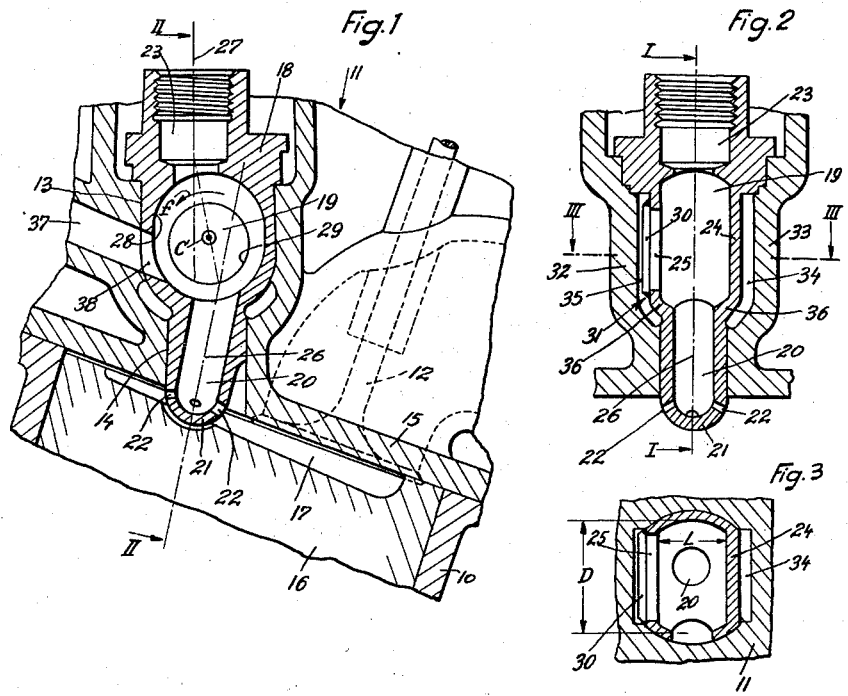
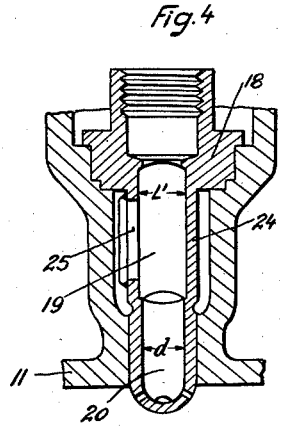
INVENTORS.
HEINRICH HOFFMANN &
HERMANN FREUDE.
BY *Dicke and Craig.*
ATTORNEYS United States Patent Office 2,857,891
Patented Oct. 28, 1958

2,857,891
INTERNAL COMBUSTION ENGINE OF THE DIESEL TYPE

Heinrich Hoffmann and Hermann Freude, Stuttgart-Unterturkheim, Germany, assignors to Daimler-Benz Aktiengesellschaft, Stuttgart-Unterturkheim, Germany Application March 24, 1954, Serial No. 418,344

Claims priority, application Germany March 25, 1953

8 Claims. (Cl. 123—32)

Our invention relates to an internal combustion engine of the diesel type provided with a pre-combustion chamber.

The object of the present invention is to so shape the pre-combustion chamber and the elements cooperating therewith that the air entering the pre-combustion chamber during the compression stroke of the piston produces a powerful vortex in the chamber, whereby the fuel injected into the chamber is effectively mixed with the air.

Further objects of the present invention are to prevent the air on entrance from the connecting passage into the pre-combustion chamber from expanding laterally and from being thereby retarded; to minimize the quantity of air revolving near the axis of the vortex at a low speed; to minimize the losses of energy of the air flow coincidentally to the entrance of the latter into the pre-combustion chamber; to enhance an even distribution of the fuel injected into the pre-combustion chamber; and to improve the thermal conditions of the precombustion chamber so as to avoid an undue delay of the ignition.

Further objects of our invention will appear from the description of two preferred embodiments of the invention following hereinafter with reference to the drawings, it being understood that such detailed description serves the purpose of illustration rather than that of limitation of the invention. In the drawings, Fig. 1 illustrates one example of the present invention showing a partial axial section through the cylinder head, the cylinder and the piston of an internal combustion engine of the diesel type, such section including a sectional view of a hollow member mounted in the cylinder head and forming the pre-combustion chamber, the section being taken along line I—I of Fig. 2, Fig. 2 is the section taken along the broken line II—II of Fig. 1, Fig. 3 is a partial section taken along line III—III of Fig. 2, and Fig. 4 shows another example of the present invention representing a sectional view similar to that of Fig. 2 taken through a cylinder similar to that shown in Figs. 1, 2 and 3, but differing therefrom by the relative width of the pre-combustion chamber and the connecting passage establishing the communication thereof with the cylinder.

In Fig. 1 the cylinder 10 of an internal combustion engine of the diesel type is equipped with a water-cooled cylinder head 11 provided with an inlet controlled by an air inlet poppet valve 12 and with an outlet not shown for the combustion gases, such outlet being controlled by a poppet valve not shown similar to valve 12.

The axes of both valves extend at right angles to the end wall 15 of the cylinder head.

The piston 16 slidably guided in the cylinder 10 and reciprocated therein by the usual crankshaft and connecting rod has a flat recess 17 in its end face, such recess communicating with the inlet and outlet above referred to and constituting the compression space.

Adjacent to the inlet and outlet the cylinder head is provided with an offset bore 13, 14 extending at an acute angle to the axis of cylinder 10 and adapted to accommodate a hollow member 18 which forms the pre-combustion chamber 19 and a connecting passage 20 establishing communication between the chamber 19 and the compression space 17. The hollow member 18 has a bottom portion 21 which projects into the compression space 17 of the cylinder and is provided with a plurality of nozzle bores 22 which establish the communication of the connecting passage 20 with the compression space 17. The disposition of the nozzle bores 22 conforms to the eccentricity of bore 14 with respect to the cylinder 10 and to the shape of the compression space 17.

Moreover, the hollow member is provided with a bore 23 which opens into chamber 19 and is adapted to accommodate a fuel injection device not shown of a well known type.

For the purposes of the present invention the chamber 19 has a round cross-sectional profile 28 shown in Fig. 1, such profile coinciding with the plane I—I which contains the axis 26 of the connecting passage 20, as will appear from Fig. 2. Moreover, the hollow member 18 has substantially plane side walls 24, 25 which extend parallel to the plane I—I preferably at equal distances therefrom.

The axis 26 of the connecting passage 20 and the axis 27 of the bore 23 for the fuel injection device do not extend through but are offset from the center C of the round cross-sectional profile 28 on opposite sides thereof, as will appear from Fig. 1. As a result, the axis 26 of the connecting passage 20 extends at an acute angle to the axis of the bore 14, the connecting passage 20 opening into the pre-combustion chamber 19 in a substantially tangential direction.

The distance L indicated in Figs. 3 and 4 of the plane side walls 24 and 25 is much shorter than the smallest diameter of the round profile 28 which, in the present embodiment, has an oval shape. This is a material feature of the present invention. As a result, the air entering from the cylinder into the connecting passage 20 during the compression stroke of the piston 16 will enter the pre-combustion chamber 19 tangentially producing a powerful vortex therein, the axis of the latter extending substantially through the center C shown in Fig. 1 at right angles to the plane side walls 24 and 25. The formation of the vortex is enhanced by the tangential disposition of bore 23 resulting in injection of the fuel tangentially into the vortex at a point diametrically opposite to the mouth of the connecting passage 20.

Preferably, one of the side walls, such as the side wall 25, is formed by a cover plate inserted in a suitable aperture 29 of the hollow member 18, the cover plate being provided with a flange 30 overlying the edge of the aperture 29 at the outside of member 18 and suitably welded thereto as indicated at 31. The aperture 29 affords access to the interior cavity of the hollow member 18 for the purpose of machining the surface of such cavity.

The cylinder head has water-cooled portions 32 and 33 which are spaced from the side walls 24 and 25 by heat-insulating clearances 34 and 35. As a result, in operation the side walls 24 and 25 will attain a higher temperature than the remainder of member 18. By this heat condition the delay of the ignition is reduced, and such reduction aids in reducing or avoiding the knocking noise incident in the idling operation of diesel engines having a pre-combustion chamber. However, wall portions, such as 36, other than the side walls 24 and 25 may be likewise spaced from water-cooled portions of the cylinder head by heat-insulating clearances.

A bore 37 in the cylinder head and an aperture 38 of hollow member 18 registering therewith are provided for insertion of an incandescent heating plug used in the customary manner for heating the pre-combustion chamber preparatory to the starting operation. In operation, the air sucked into the cylinder 10 by the descending piston 16 past the inlet valve 12 flows, when compressed by the rising piston 16, through nozzle openings 22 into the connecting passage 20 and thence into the pre-combustion chamber 19, where the air flows in the direction indicated by the arrow f so as to form a vortex about the center C of the pre-combustion chamber. Owing to the restricted width L of the pre-combustion chamber 19, the air stream issuing from the overflow passage 20 is prevented from spreading laterally, whereby a powerful vortex will be obtained. The rotary motion of the air is enhanced by the tangential injection of the fuel in the direction of axis 27.

As shown in Fig. 1, the axis of the bore 13, 14 accommodating the hollow member 18 is inclined relative to the axis of cylinder 10 and relative to the stems of the valves, such as valve 12. If desired, however, the bore accommodating the hollow member 18 may extend parallel to the cylinder axis.

As shown in Fig. 3, the smaller diameter D of the oval profile 28 is about fifty percent larger than the distance L of the side walls 24 and 25. While this percentage may vary between wide limits, it is a material feature of the present invention that D should be larger than L.

In the embodiment of the invention illustrated in Fig. 4, the distance L of the side walls 24 and 25 equals substantially the width d of the connecting passage 20. As a result, no lateral expansion whatsoever is permitted to the stream of air issuing during the compression stroke from the connecting passage 20 into the pre-combustion chamber 19.

From the description it will appear that owing to the shape and coordination of the pre-combustion chamber 19 with the connecting passage 20 as described, the air entering the chamber during the compression stroke is so conducted through the outer walls of the pre-combustion chamber as to form a powerful vortex, the flattened shape of the pre-combustion chamber avoiding an undue lateral spreading and consequent retardation of the air stream issuing from the overflow passage into the pre-combustion chamber. At the same time, the proportion of the air circulating at low speed near the axis of the vortex is reduced in a favorable manner.

Preferably, the pre-combustion chamber is so flattened that its length L or L' measured along the axis of the vortex corresponds substantially to the width d of the overflow passage measured in the same direction, no matter whether the cross section of the connecting passage is circular. The air entering the pre-combustion chamber from the connecting passage is conducted as a whole along the rotary path f by the circumferential walls of the pre-combustion chamber 19, a lateral spreading of such air stream upon issuing from the connecting passage being limited to a minimum or prevented altogether. The vortex is formed in the pre-combustion chamber without any substantial loss of the kinetic energy of the stream of air flowing through passage 20.

The rotary motion of the air is enhanced by the injection of the fuel in the tangential direction of axis 27, and the fuel injection into the vortex is conducive to an even distribution of the fuel in the air. For that reason, the axis 27 of the injection device and the axis 26 of the connecting passage are offset from the center C of the vortex on opposite sides of such center.

While we have described our invention with reference to two preferred embodiments thereof, we wish it to be clearly understood that the same is in no way limited to the details described, but is capable of numerous modifications within the scope of the appended claims.

What we claim is:

1. In an internal combustion engine of the diesel type, a cylinder head mounted on a cylinder, a piston reciprocating in said cylinder, a main combustion chamber formed in said piston, a hollow member mounted in said cylinder head including a precombustion chamber and a communicating passage connecting said precombustion chamber with said main combustion chamber, a bore provided in said hollow member communicating with said precombustion chamber for accommodating a fuel injection device, said precombustion chamber having a round cross-sectional profile in a plane which essentially contains the axes of said connecting passage and said bore, said hollow member having substantially plane side walls extending parallel to said plane, the axis of said connecting passage and the axis of said bore for a fuel injection device being offset from the center of said round cross-sectional profile on opposite sides thereof, said cylinder head having water-cooled portions spaced from said plane side walls by heat-insulating clearances.

2. The combination claimed in claim 1, in which said plane side walls are spaced a distance from each other which equals substantially the width of said connecting passage.

3. The combination claimed in claim 1, in which wall portions of said hollow member other than said plane side walls are spaced from water-cooled portions of said cylinder head by heat-insulating clearances.

4. The combination claimed in claim 1, in which said hollow member is formed with a lateral opening, a cover being provided which closes such opening and constitutes one of said side walls.

5. The combination claimed in claim 1, in which the smallest diameter of said sectional profile is substantially larger than the distance between said side walls.

6. In an internal combustion engine of the diesel type, a cylinder head mounted on a cylinder, a piston reciprocating in said cylinder, a main combustion chamber formed in said piston, a hollow member mounted in said cylinder head including a precombustion chamber and a communicating passage connecting said precombustion chamber with said main combustion chamber, a bore provided in said hollow member communicating with said precombustion chamber for accommodating a fuel injection device, said precombustion chamber having a round cross-sectional profile in a plane which essentially contains the axes of said connecting passage and said bore, said hollow member having substantially plane side walls extending parallel to said plane, the axis of said connecting passage and the axis of said bore for a fuel injection device being offset from the center of said round cross-sectional profile on opposite sides thereof, said hollow member having a portion projecting into said main combustion chamber being provided with a plurality of nozzle throttle openings establishing the communication of said connecting passage with said main combustion chamber.

7. In an internal combustion engine of the diesel type, a cylinder, a piston reciprocating in said cylinder, a cylinder head delimiting the cylinder with the piston in the top dead center position to provide a main combustion chamber therebetween, a pre-combustion chamber in said cylinder head having a cross section of a body of rotation, said pre-combustion chamber being delimited by substantially plane side walls substantially perpendicular to the axis of said body of rotation, an injection device opening into said pre-combustion chamber, a communicating passage connecting said main combustion chamber with said precombustion chamber and opening into the latter substantially tangentially, and a wall with throttle openings therein delimiting said passage in the direction toward said main combustion chamber and operative to distribute the contents of said pre-combustion chamber in said main combustion chamber.

8. In an internal combustion engine, the combination according to claim 7, wherein said main combustion chamber is formed by a recess in said piston, said last-mentioned wall extending into said recess, and said throttle openings being approximately perpendicular to the axis of said passage essentially in the direction of the main dimension of said main combustion chamber.

References Cited in the file of this patent

UNITED STATES PATENTS

| | | |
|---|---|---|
| 1,720,182 | Maybach | July 9, 1929 |
| 1,835,490 | Hesselman | Dec. 8, 1931 |
| 2,120,768 | Ricardo | June 14, 1938 |
| 2,148,505 | Rosen | Feb. 28, 1939 |

FOREIGN PATENTS

| | | |
|---|---|---|
| 433,838 | Great Britain | Aug. 21, 1935 |

OTHER REFERENCES

Internal Combustion Engines by Lichty, 6th Edition, 4th Impression, McGraw-Hill Book Co. Inc., New York, 1939.

High Speed Diesel Engines by Heldt, 6th Edition, P. M. Heldt, Nyack, New York, 1950.